N. WEBB.
Car-Brake.
No. 215,187.　　　　　　　Patented May 6, 1879.
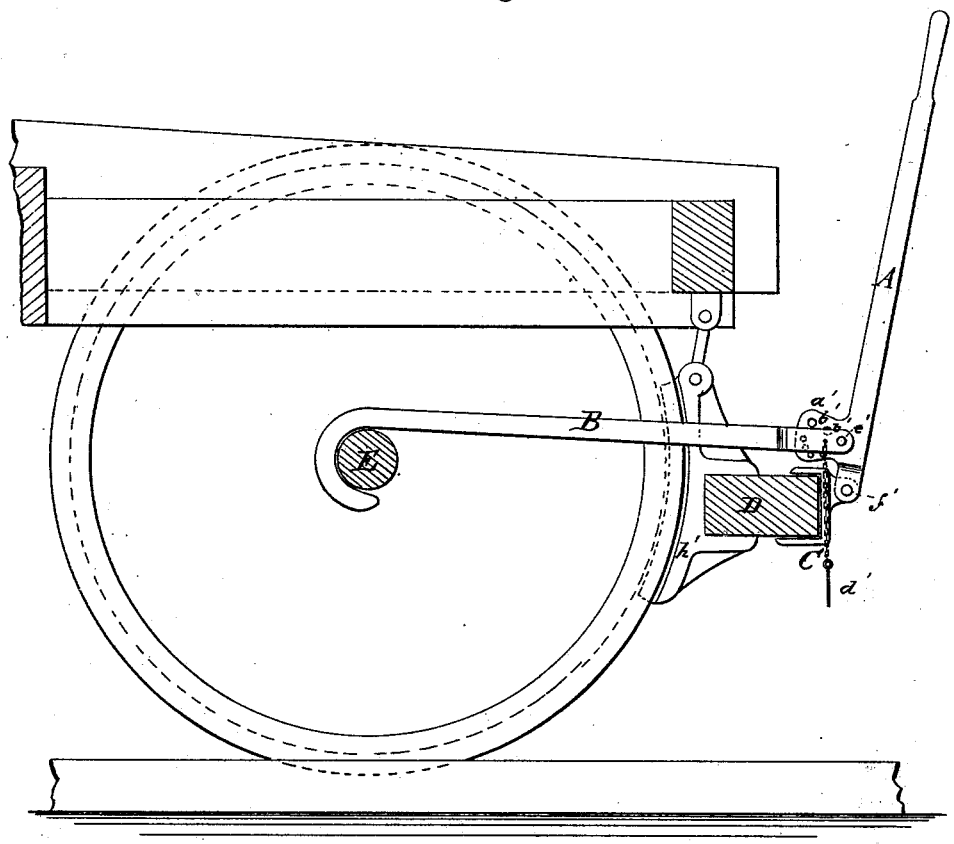
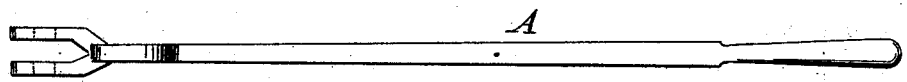
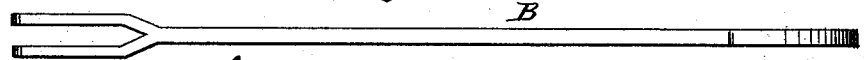
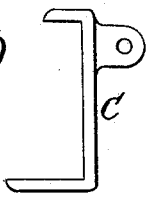
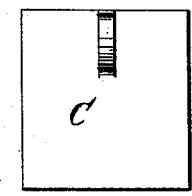

UNITED STATES PATENT OFFICE.

NATHAN WEBB, OF SACRAMENTO, CALIFORNIA.

IMPROVEMENT IN CAR-BRAKES.

Specification forming part of Letters Patent No. 215,187, dated May 6, 1879; application filed March 18, 1879.

*To all whom it may concern:*

Be it known that I, NATHAN WEBB, of Sacramento, in the county of Sacramento and State of California, have invented a new and Improved Railroad-Car-Brake-Connecting Clamp, of which the following is a specification.

Figure 1 represents the clamp in position on a car. Fig. 2 is a plan of the lever of the clamp. Fig. 3 is a plan of the axle-hook of the clamp. Fig. 4 is a side elevation of the beam-plate of the clamp. Fig. 5 is a plan of the beam-plate.

Similar letters of reference indicate corresponding parts.

The object of this invention is to provide a simple and effective car-connecting brake-clamp that can be used as a supplement to or independently of any other brake-connecting clamp.

The device consists of the lever A, from near the lower end of which the flat lug $a'$ projects, that is pierced with several holes, $b'\ b'$, near its edge. The forked end of the axle-hook B straddles this lug, and is pivoted thereto by the pin $e'$, that may pass through any one of the holes $b'\ b'$. The smaller holes shown in this lug or eccentric are for the insertion of the retaining-pin $d'$, that serves to hold up the axle-hook. Just below this lug or eccentric, and in the forked end of the lever, swings the beam-plate C on a pin, $f'$, that passes through the ear that projects from the upper face of the plate. All these parts are made of steel or wrought or malleable iron.

This device is applied to a car by hooking the end of the axle-hook over the axle E of the wheel and setting the beam-plate on and against the brake-beam D of the car, as shown in Fig. 1. Then, or even prior to this, the angle between the lever and the axle-hook is properly adjusted on the eccentric $a'$, and force applied to move the handle of the lever outward and press the brake-beam, with its shoe $h'$, against the periphery of the car-wheel.

The device is simple and easy of application and adjustment, and can be attached to a car without the dangerous necessity of going under the brake-beam to make it fast to the axle.

Having thus fully described my invention, I claim as new and desire to secure by Letters Patent—

1. The herein-described car-brake-connecting clamp, composed of lever A, axle-hook B, beam-plate C, and lug or eccentric $a'$, constructed and arranged substantially as shown, and for the purpose described.

2. In the construction of a car-brake-connecting clamp, the combination of the axle-hook B with a lever, A, provided with a lug or eccentric, by means of which the angles between the said hook and lever may be changed or adjusted at will, substantially as herein shown and described.

NATHAN WEBB.

Witnesses:
JOHN H. LEWIS,
F. H. KIEFER.